(12) United States Patent
Seita

(10) Patent No.: US 7,625,139 B2
(45) Date of Patent: Dec. 1, 2009

(54) IMAGE SENSING APPARATUS

(75) Inventor: Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 11/211,388

(22) Filed: Aug. 24, 2005

(65) Prior Publication Data
US 2006/0045515 A1 Mar. 2, 2006

(30) Foreign Application Priority Data
Aug. 26, 2004 (JP) .............................. 2004-246812

(51) Int. Cl.
G03B 17/04 (2006.01)
(52) U.S. Cl. .................. 396/348; 396/349; 396/351; 396/352; 396/358; 359/817
(58) Field of Classification Search ............. 396/348, 396/349, 351, 352, 358; 359/367, 726, 817
See application file for complete search history.

(56) References Cited

U.S. PATENT DOCUMENTS

| 4,398,811 | A  | * | 8/1983  | Nishioka et al. ............. 359/367 |
| 5,432,574 | A  | * | 7/1995  | Miyazawa et al. ........... 396/349 |
| 6,978,089 | B2 | * | 12/2005 | Nomura et al. ................ 396/75 |
| 7,483,219 | B2 | * | 1/2009  | Hayashi et al. .............. 359/697 |
| 2003/0160902 | A1 | | 8/2003 | Mihara et al. |

FOREIGN PATENT DOCUMENTS

| JP | 1992-278932 | * | 5/1992 |
| JP | 7-333505    |   | 12/1995 |
| JP | 10-142671   |   | 5/1998 |
| JP | 2000-515255 |   | 11/2000 |
| JP | 2003-156789 | * | 5/2003 |
| JP | 2004-020849 |   | 1/2004 |

OTHER PUBLICATIONS http://www.creativepro.com/article/little-wonder-canon-s-pocket-sized-camera-travels-light Jul. 12, 2000.*
Chinese Office Action dated Dec. 21, 2007 with English translation concerning application No. 2005100929875.

* cited by examiner

Primary Examiner—W B Perkey
Assistant Examiner—Michael A Strieb
(74) Attorney, Agent, or Firm—Cowan, Liebowitz & Latman, P.C.

(57) ABSTRACT

An image sensing apparatus includes an optical member that bends and changes the optical path of the incident light; a first lens group, that is driven to retract at least partially inside the image sensing apparatus when a picture is not to be taken and to be projected outside the image sensing apparatus and toward the subject when a picture is to be taken; and a second lens group, as well as a lens barrier for protecting the first lens group when said first lens group is retracted inside the image sensing apparatus. The optical member moves to a position where the optical path of the optical image of the subject, which is incident via the first lens group, is changed to the direction of the second lens group when a picture is to be taken, and moves to a position where it is withdrawn from this area when a picture is not to be taken.

9 Claims, 4 Drawing Sheets

IMAGE SENSING APPARATUS

FIELD OF THE INVENTION

This invention relates to an image sensing apparatus such as a digital camera.

BACKGROUND OF THE INVENTION

Digital cameras have been reduced in size and weight in recent years with the objective of improving portability. Higher performance is being sought while keeping the size of the image sensing device and the diameters of lenses small in order to attain the objective. In particular, slimmer design has been achieved by a method of bending the optic axis using a dioptric member that employs a reflecting mirror or a prism in the optical system, and by projecting part of the optical system from within the camera body when a picture is to be taken and retracting it into the camera body when a picture is not to be taken. (For example, see the specifications of Japanese Patent Application Laid-Open Nos. 10-142671 and 2004-20849).

However, it is known that regardless of whether the optical system adopted is the one that uses the dioptric member or the one that is partially projected at the time of photography, limitations are imposed upon the angle of view that allows picture taking and upon the size of the image sensing device relative to the thickness of the camera body in order to satisfy the requirements of slimmer design and higher performance.

An example of a slim-body camera in which the picture-taking optical system is provided with a reflecting optical member formed to have a curved surface to make possible wide-angle image sensing and telephoto image sensing is disclosed in the specification of Japanese Patent Application Laid-Open No. 7-333505.

Further, an example of a slim-body camera that illustrates the relationship between the thickness of a curved optical system accommodated in the camera body and the size of the image formed is disclosed in the specification of Japanese Patent Application Laid-Open No. 2000-515255.

Japanese Patent Application Laid-Open No. 7-333505 contemplates a reduction in thickness and weight by providing the camera with a function that corresponds to the front lens group of the image sensing lenses. This is achieved by providing the reflecting optical member with a curved surface. Although wide-angle image sensing is possible in a case where the shape of the curved surface of the reflecting optical member is convex, this arrangement is not suited to telephoto image sensing. In other words, the shape of the curved surface is required to be concave in order to perform telephoto image sensing, and the problem is that this method using the concave surface does not make it possible to satisfy the wide-angle and telephoto angle of view requirements simultaneously. Although a method of electrically controlling the shape of the curved surface of the reflecting optical member is conceivable, there are limitations upon the shape that can be varied and an additional problem is that circuit devices for control, etc., are required.

Further, Japanese Patent Application Laid-Open No. 2000-515255 aims to reduce the thickness of the camera body while providing the front lens group of the image sensing lenses with an image sensing lens that does not project from the camera body. However, a problem which arises is that owing to the relationship between the thickness of the optical system and the size of the image formed, the thickness of the camera body becomes thicker as the size of the image sensing device becomes larger.

SUMMARY OF THE INVENTION

The present invention has been made in consideration of the above situation, and its object is to raise the degree of freedom of lens design while the size of a camera when a picture is not being taken is kept small.

According to the present invention, the foregoing object is attained by providing an image sensing apparatus having an image sensing device for outputting an electric signal in accordance with amount of incident light, comprising: an optical member that bends and changes the optical path of the incident light; a first lens group that is arranged on a side of a photographic subject with respect to the optical member, the first lens group being driven so as to be at least partially accommodated within the image sensing apparatus when a picture is not to be taken and so as to be projected toward the subject from the accommodated state when a picture is to be taken; and a second lens group arranged on a side of the image sensing device with respect to the optical member, wherein the optical member moves to a position where the optical path of the optical image of the subject, which is incident via the first lens group, is changed to the direction of the second lens group when a picture is to be taken, and moves to a position where it is withdrawn from an area in which the first lens group is accommodated when a picture is not to be taken.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

A preferred embodiment of the present invention will be described in detail in accordance with the accompanying drawings. However, the dimensions, shapes and relative positions of the constituent parts shown in the embodiments should be changed as convenient depending on various conditions and on the structure of the apparatus adapted to the invention, and the invention is not strictly limited to the embodiments described herein.

First Embodiment

Figure 1A:
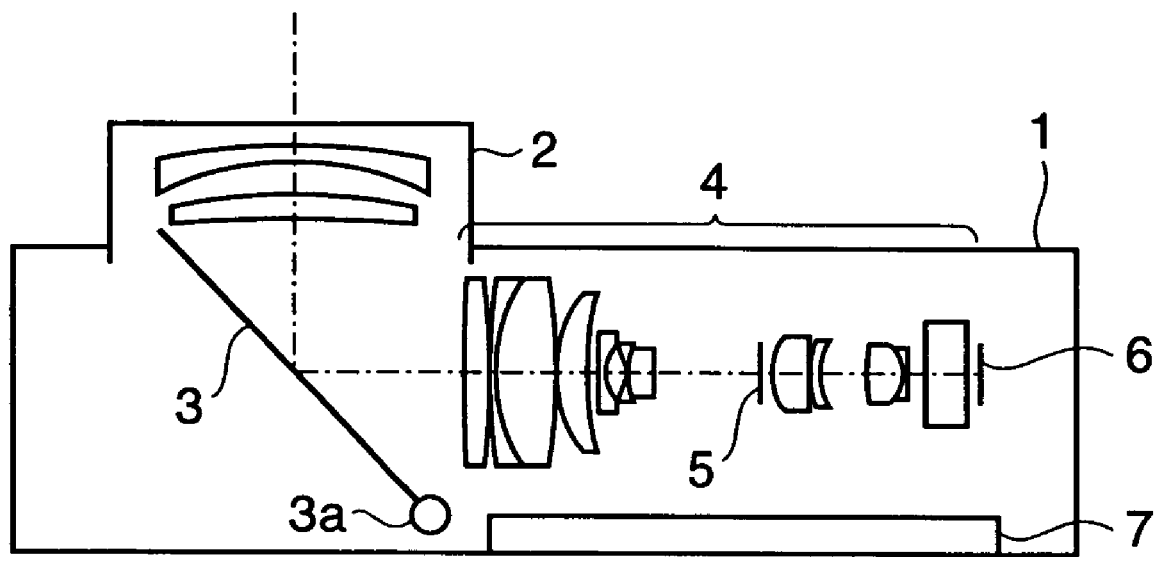
FIGS. 1A and 1B are top sectional views illustrating the structure of a digital camera according to a first embodiment of the present invention.
Figure 1B:
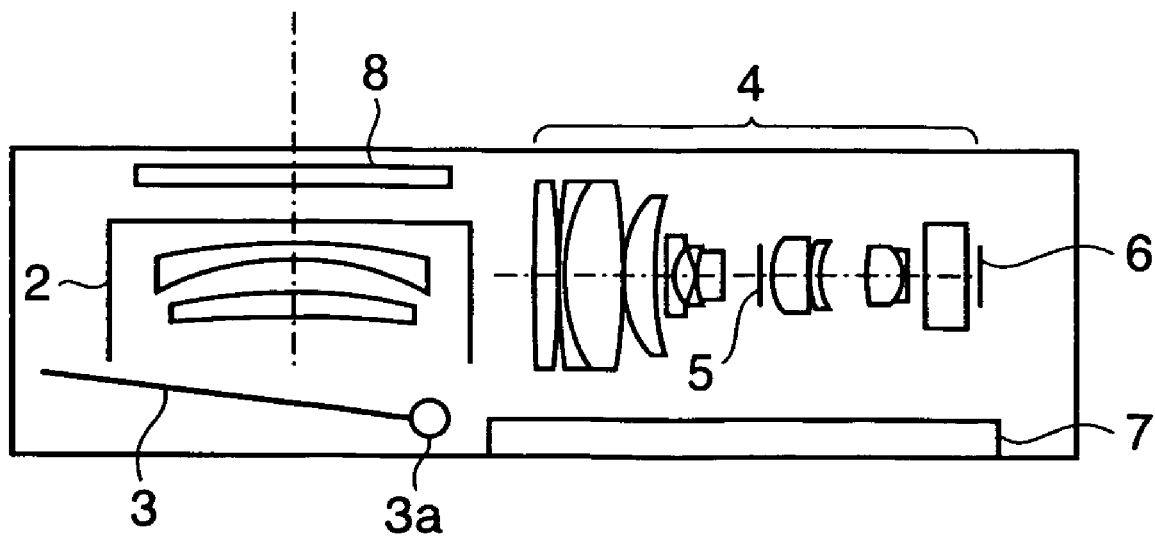

FIGS. 1A and 1B are top sectional views illustrating the structure of a digital camera according to a first embodiment of the present invention, in which FIG. 1A illustrates the camera when a picture is to be taken and FIG. 1B the camera when a picture is not to be taken.

As shown in FIGS. 1A and 1B, the digital camera includes a camera body 1; a first lens group 2; an iris diaphragm 5; a second lens group 4 that contains the iris diaphragm 5; a reflecting mirror 3, which is adapted to rotate about a center 3a, serving as an optical member for bending the optical path toward the second lens group 4; an image sensing device 6; a display monitor 7 disposed on the back surface of the camera body 1; and a lens barrier 8 for protecting the first lens group 2 when it is accommodated within the camera body 1.

The state of the digital camera at the time of photography will be described first. As shown in FIG. 1A, light from a subject passes through the first lens group 2 that is projecting from the camera body 1, after which the optical path of the light is bent by approximately 90° by the reflecting mirror 3. The light is then introduced to the image sensing device 6 through the second lens group 4, iris diaphragm 5 and other lenses and filters (not shown). A captured image and an indication of information for picture taking can be displayed on the display monitor 7.

To terminate picture taking, an operation is performed to cause the second lens group 4 to be withdrawn toward the side of the image sensing device 6, as shown in FIG. 1B, after which the reflecting mirror 3 is rotated in the counter-clockwise direction. The first lens group 2 is then retracted so as to be accommodated inside the camera body 1 in the space produced by the withdrawing operation. By adopting this expedient, the space produced by the withdrawing operation can be exploited effectively.

The reflecting mirror 3 is biased by a spring toward the position as it would occupy at the time of photography, and it may be so arranged that the operation for rotating the mirror to achieve retraction is linked to the operation for retracting the first lens group 2.

Figure 2:
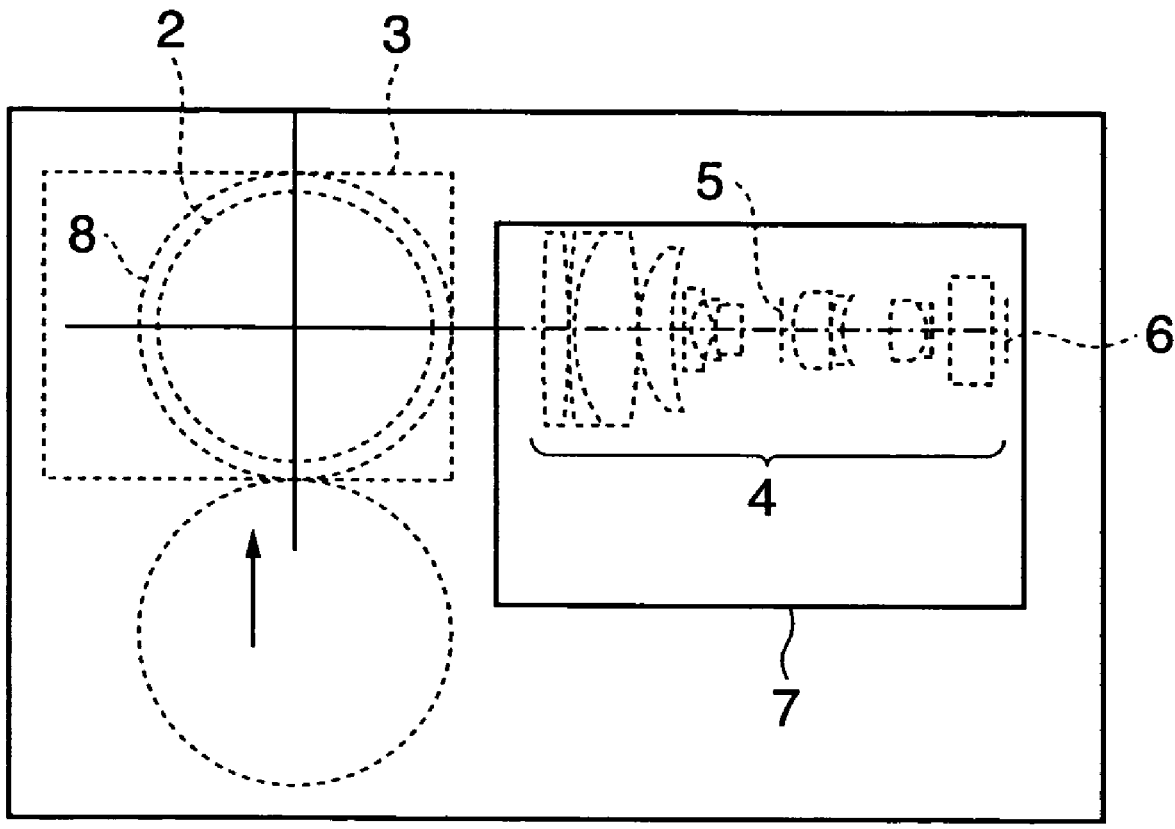
FIG. 2 is a back view of the digital camera when a picture is not being taken in the first embodiment.

FIG. 2 is a back view of the digital camera when a picture is not being taken in the first embodiment. Here the second lens group 4, iris diaphragm 5, image sensing device 6 and lens barrier 8 are illustrated in phantom view. As shown in FIG. 2, the lens barrier 8 is accommodated within the thickness of the camera body beneath the first lens group 2 when a picture is taken. Upon the conclusion of picture taking, the first lens group 2 is fully retracted into the camera body 1 and further retracted deeper within the camera. Then the lens barrier 8 slid upwardly to protect the lenses.

If the first lens group 2 to be retracted can thus be accommodated deeply within the camera body 1, then the lens barrier 8 can be placed in front of the first lens group 2 without enlarging the thickness of the camera body 1.

Further, by placing the display monitor 7, which is provided on the back side of the camera body 1 in order to check a sensed image, at a position where it will not overlap the first lens group 2 and reflecting mirror 3 in the direction of thickness, an increase in the thickness of the camera body 1 can be prevented.

Further, by placing the monitor at a position where it is approximately parallel to the first lens group 2, for example, the space into which the first lens group 2 and reflecting mirror 3 are retracted is enlarged further. This makes it possible to further reduce the thickness of the camera body 1.

Further, by making the total length of the first lens group 2 small in comparison with the second lens group 4, thickness when the first lens group 2 is retracted is suppressed. In addition, by placing the second lens group 4 in line with the direction of the longest side of the camera body 1, the size of the camera body 1 in a plane need not be enlarged.

Figure 4A:
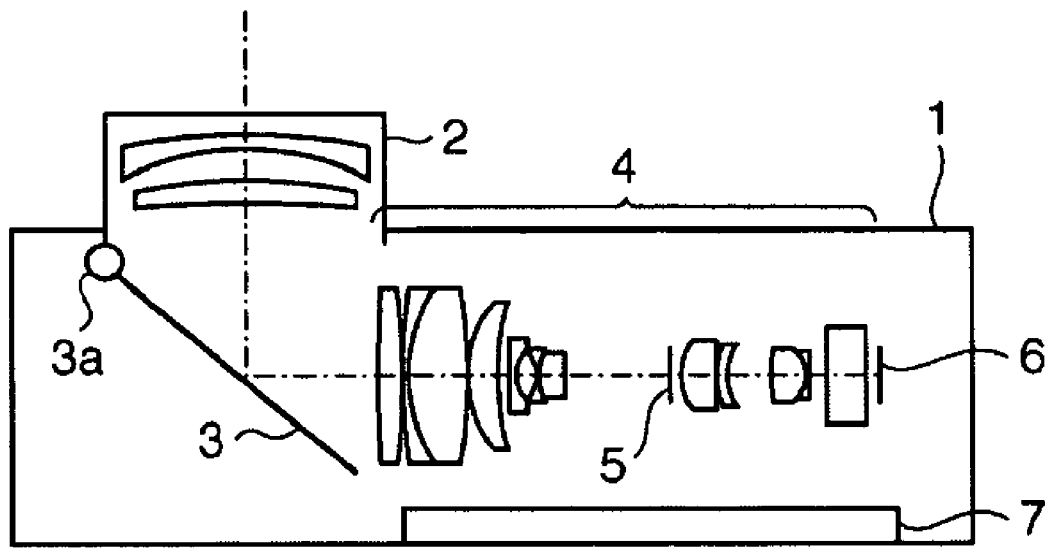
FIGS. 4A and 4B are top sectional views illustrating the structure of a digital camera according to a further embodiment of the present invention.
Figure 4B:
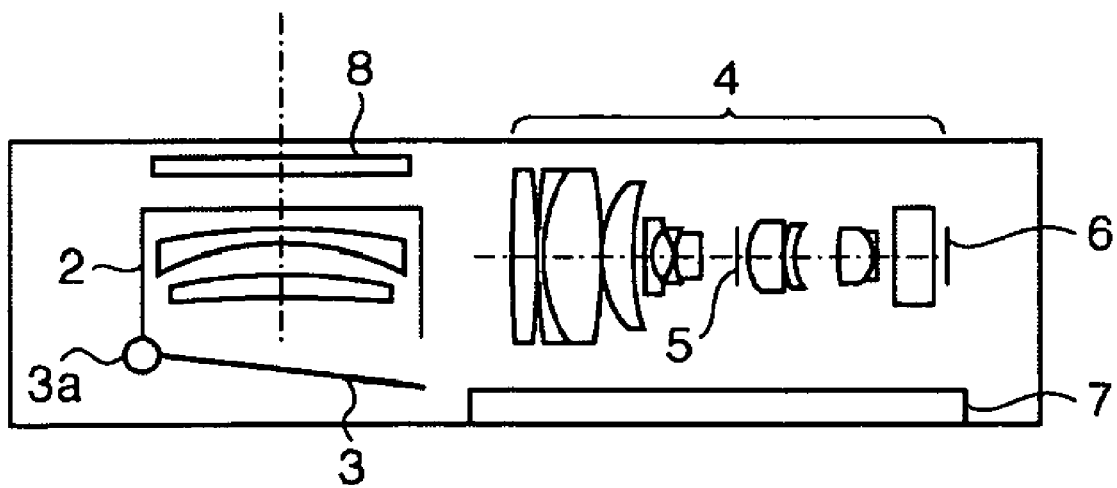

Further, since the rotary shaft of the reflecting mirror 3 and the direction of the rotation of the mirror 3 need only be such that a space into which the first lens group 2 is retracted is assured, there is no limitation upon the rotary shaft and direction of rotation. It is possible to adopt an arrangement in which the rotary shaft of the reflecting mirror 3 is situated at a position other than that of the reflecting mirror 3 or at another position within the camera body. For example, as illustrated in FIG. 4a and FIG. 4b, the rotary shaft of the reflecting mirror 3 may be provided on the lens barrel of the first lens group. By rotating the shaft in the counter-clockwise direction when a picture is not to be taken, both the shaft and the first lens group 2 are moved into and accommodated inside the camera body 1.

Further, the structure of the first lens group 2 may include a single lens or a plurality of lenses. Furthermore, the first lens group 2 need not be received fully within the camera body 1 when it is in the retracted state; if the amount of projection of the first lens group 2 from the camera body 1 is at least made less than the amount of projection at the time of photography, then the size of the camera when a picture is not to be taken can be made less in comparison with that when a picture is to be taken.

In accordance with the first embodiment, as described above, the first lens group can be retracted into the camera body by rotating and moving the reflecting optical member when a picture is not to be taken. As a result, even if the first lens group is composed of a plurality of lenses, the thickness of the camera body can be reduced. Further, the first lens group can be constructed by a plurality of lenses. This means that by using a plurality of lenses to construct the first lens group, there is greater degree of freedom in terms of lens design and it is possible to provide a lens arrangement for wide-angle image sensing and a lens arrangement for high-magnification image sensing.

Second Embodiment

Figure 3A:
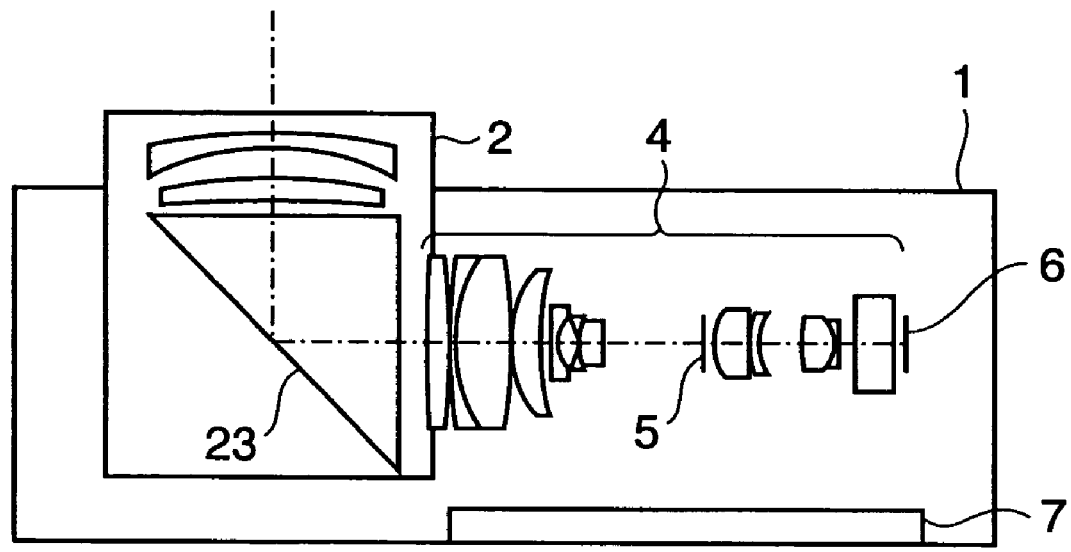
FIGS. 3A and 3B are top sectional views illustrating the structure of a digital camera according to a second embodiment of the present invention.
Figure 3B:
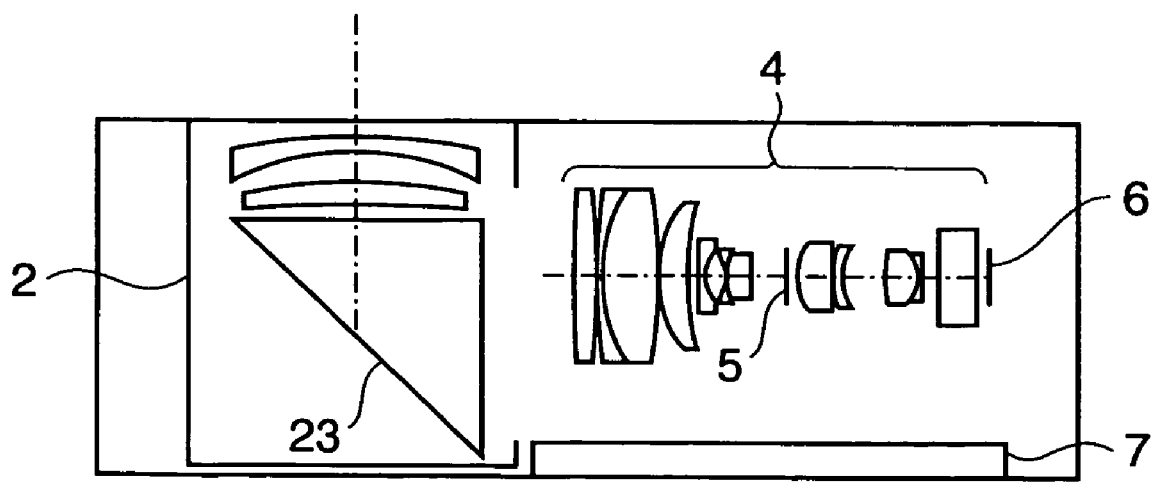

FIGS. 3A and 3B are top sectional views illustrating the structure of a digital camera according to a second embodiment of the present invention, in which FIG. 3A illustrates the camera when a picture is to be taken and FIG. 3B the camera when a picture is not to be taken.

The arrangement shown in FIGS. 3A and 3B differs from that of FIGS. 1A and 1B in that a prism 23 is used instead of the reflecting mirror 3. Components in FIGS. 3A and 3B identical with those of FIGS. 1A and 1B are designated by like reference characters and need not be described again.

In the second embodiment, the prism 23 is used as a bending optical member behind the first lens group 2. When picture taking is to be terminated, the first lens group 2 and prism 23 are retracted in unison along the thickness direction of the camera body 1. Owing to this arrangement, the optic axes of the first lens group 2 and prism 23 can be made to coincide at all times. As a result, there is no danger of a decline in optical performance.

In accordance with the arrangement described above, effects similar to those of the first embodiment can be obtained even in a case where the prism 23 is used.

It should be noted that although the second lens group 4 is caused to withdraw in FIG. 3B, this is not an essential operation and it may be performed only when necessary. Further, it may be so arranged that the prism 23 and second lens group 4 are moved in unison transversely of the camera body 1 in FIG. 3A to produce a space into which the first lens group 2 is retracted.

Thus, by retracting the prism 23 and the first lens group or second lens group in unison in the same direction, retraction can be performed while optical performance is maintained. Further, if the directions of retraction are the same, the components that construct the retraction mechanism can be simplified and common components can be used.

Further, it may be so arranged that the prism 23 is rotated in a manner similar to that of the first embodiment to produce even more space for retraction of the first lens group 2. In this case thickness can be reduced even further in comparison with the arrangement shown in FIGS. 3A and 3B.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-246812 filed on Aug. 26, 2004, which is hereby incorporated by reference herein.

What is claimed is:

1. An image sensing apparatus having an image sensing device for outputting an electrical signal in accordance with the amount of incident light, comprising:

an optical member that bends and changes the optical path of the incident light;

a first lens group that is arranged on a side of a photographic subject with respect to said optical member, said first lens group that is driven to retract at least partially inside the image sensing apparatus when a picture is not to be taken and to be projected outside the image sensing apparatus and toward the subject when a picture is to be taken; and a second lens group placed on a side of the image sensing device different from said optical member, a lens barrier for protecting the first lens group when said first lens group is retracted inside the image sensing apparatus, a rotary shaft of the optical member provided on a lens barrel of the first lens group, wherein said optical member moves to a position where the optical path of the optical image of the subject, which is incident via said first lens group, is changed to the direction of said second lens group when a picture is to be taken, and when a picture is not to be taken, said optical member moves to a position where it is withdrawn toward the side of the image sensing apparatus and withdrawn from a position where the optical path of the optical image of the subject is changed to the direction of said second lens group, wherein said lens barrier withdraws away from the front of the first lens group when a picture is to be taken by sliding away from the front of the first lens group inside the image sensing apparatus, and the lens barrier slides back in front of the first lens group when a picture is not to be taken, and wherein rotation of the rotary shaft retracts the first lens group and the optical member at least partially inside the image sensing apparatus.

2. The apparatus according to claim 1, wherein said optical member is retracted in the same direction as said first lens group.

3. The apparatus according to claim 1, wherein said optical member is retracted in the same direction as said second lens group.

4. The apparatus according to claim 1, wherein said optical member is a reflecting mirror.

5. The apparatus according to claim 1, wherein said optical member is a prism.

6. The apparatus according to claim 1, wherein at least part of said second lens group is retracted in a direction away from said first lens group.

7. The apparatus according to claim 1, further comprising a display monitor;

wherein said first lens group and said optical member are provided so as not to overlap the display monitor along the thickness direction of the image sensing apparatus.

8. The apparatus according to claim 1, wherein said second lens group has a total length greater than that of said first lens group and is disposed along the longitudinal direction of the image sensing apparatus.

9. The apparatus according to claim 1, wherein said first lens group is supported by a lens barrel, and said lens barrel is accommodated within the image sensing apparatus when a picture is not to be taken.

\* \* \* \* \*